United States Patent
Shim et al.

(10) Patent No.: US 7,275,205 B2
(45) Date of Patent: Sep. 25, 2007

(54) DATA MODULATION METHOD AND APPARATUS CAPABLE OF SUPPRESSING DC COMPONENT USING PARITY INFORMATION OF SYNCHRONIZATION CODEWORD

(75) Inventors: Jae-seong Shim, Seoul (KR); Jin-han Kim, Gyeonggi-do (KR); Hyun-soo Park, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 748 days.

(21) Appl. No.: 10/791,268

(22) Filed: Mar. 3, 2004

(65) Prior Publication Data

US 2004/0205423 A1 Oct. 14, 2004

(30) Foreign Application Priority Data

Mar. 13, 2003 (KR) ............... 10-2003-0015856

(51) Int. Cl.
*G06F 11/00* (2006.01)
*H03M 13/00* (2006.01)

(52) U.S. Cl. ........................... 714/800
(58) Field of Classification Search .......... 714/800
See application file for complete search history.

(56) References Cited

U.S. PATENT DOCUMENTS 5,757,752 A * 5/1998 Kunisa ............... 369/59.26
6,002,718 A  12/1999 Roth ................. 375/292
6,654,425 B1 * 11/2003 Itoh et al. ............ 375/295

FOREIGN PATENT DOCUMENTS

| EP | 0 763 918 A1 | 3/1997 |
| EP | 0 771 078 A2 | 5/1997 |
| EP | 1 274 172 A2 | 1/2003 |

OTHER PUBLICATIONS

Kunisa, Akiomi, Comparison of two guided scrambling schemes for optical disks, Aug. 2002, IEEE Trans. on Consumer Electronics, vol. 48, No. 3, pp. 584-588.*
Search Report issued on Feb. 21, 2007 by the European Patent Office for European Patent Application No. 04251274.9.
Kunsia. "Runlength Control Based on Guided Scrambling for Digital Magnetic Recording" IEICE Transactions on Electronics, Electronics Society, Tokyo, JP, vol. E82-C, No. 12, Dec. 1999, pp. 2209-2217.

* cited by examiner

*Primary Examiner*—Shelly Chase
(74) *Attorney, Agent, or Firm*—Stein, McEwen & Bui, LLP

(57) ABSTRACT

A data modulation method to suppress a DC component using parity information of a synchronization codeword, and an apparatus for executing the method. Input data is multiplexed according to multiplexing information, the synchronization codeword including the multiplexing information for a multiplexed data stream is inserted, modulation is performed and plural modulated data streams are output, and a respective one of the modulated data streams having a DC component, which is smallest is selected from among the modulated streams. The synchronization codeword has a bit to control the parity of the codeword, and the input data is multiplexed according to whether a parity of the synchronization codeword is even or is odd. Thus, the DC component included in the modulated codeword stream may be more effectively suppressed without a decrease in a code rate.

33 Claims, 5 Drawing Sheets

FIG. 2A  SYNCHRONIZATION CODEWORD=SYNC BODY+MULTIPLEXING ID (PARITY CONTROL)

FIG. 2B  SYNCHRONIZATION CODEWORD=SYNC BODY+SYNC ID+MULTIPLEXING ID (PARITY CONTROL)

FIG. 2C  SYNCHRONIZATION CODEWORD=SYNC BODY+SYNC ID MIXED WITH MULTIPLEXING ID (PARITY CONTROL)

FIG. 3

| SYNCHRONIZATION CODEWORD | | PARITY |
|---|---|---|
| SYNC BODY | MULTIPLEXING ID (PARITY CONTROL) | |
| 0100000000100000000010 | 010x0 | ODD WHEN x=1 EVEN WHEN x=0 |

…

DATA MODULATION METHOD AND APPARATUS CAPABLE OF SUPPRESSING DC COMPONENT USING PARITY INFORMATION OF SYNCHRONIZATION CODEWORD

CROSS-REFERENCE TO RELATED APPLICATIONS

This application claims the priority of Korean Patent Application No. 2003-15856, filed on Mar. 13, 2003, in the Korean Intellectual Property Office, the disclosure of which is incorporated herein by reference.

BACKGROUND OF THE INVENTION

1. Field of the Invention

The present invention relates to data modulation, and more particularly, to a data modulation method capable of suppressing a DC component using parity information of a synchronization codeword, and an apparatus for executing the method.

2. Description of the Related Art

A multimode coding method is a method of granting DC suppression ability to a modulation code without DC suppression ability. Even though a-bit additional information is inserted in an input data row, $2^a$ different random data rows are generated, and modulation without DC suppression ability is performed for the $2^a$ different random data rows, the multimode coding method has DC suppression ability by selecting the modulated data row having the smallest DC component among the $2^a$ different random data rows.

In a conventional multiplexing method of converting an input data row into $2^a$ different random data rows by using the a-bit additional information, input data is transmitted as a run length limited (RLL) stream by consecutively scrambling the input data. However, if an error is generated in the transmitted RLL stream when inverse data conversion is performed, the error propagates, affecting not only the data where the error was generated but subsequent data as well. Such error propagation is characteristic of a multimode coding method using scrambling.

Further, in the conventional art, in a case where additional bits for a synchronization codeword and a multiplexing ID are inserted in a data row multiplexed and randomized through consecutive scrambling, or where the multiplexing ID is inserted in the data row according to a size of a data block, regardless of the synchronization codeword, a number of additional bits corresponding to the multiplexing ID increases.

SUMMARY OF THE INVENTION

The present invention provides a data modulation method capable of effectively suppressing DC components included in modulated codeword streams without reducing a code rate, and an apparatus that executes the method.

The present invention further provides a data modulation method capable of improving DC component suppression ability by having a bit capable of controlling parity in a synchronization codeword and multiplexing input data according to the parity of the synchronization codeword, and an apparatus that executes the method.

The present invention further provides a data modulation method capable of effectively suppressing DC components included in modulated codeword streams by including a multiplexing ID in a synchronization codeword, having parity in the multiplexing ID, and controlling parity of a whole synchronization codeword, and an apparatus that executes the method.

According to an aspect, a data modulation method is provided including: multiplexing input data according to multiplexing information; inserting a synchronization codeword including multiplexing information for a multiplexed data stream, and performing data modulation and outputting each modulated data stream; and selecting a modulated data stream having a smallest DC component from among the modulated streams.

According to another aspect, a data modulation method is provided, which converts m-bit source data into an n-bit codeword ($n \geq m$) where a minimum constraint length is d and a maximum constraint length is k, the data modulation method including: multiplexing input data segmented by a predetermined length according to multiplexing information by discontinuously scrambling the segmented input data; inserting a synchronization codeword including the multiplexing information for a multiplexed data stream, and performing run length limited (RLL) modulation and outputting each modulated data stream; and selecting a respective modulated data stream having a DC component, which is smallest from among the modulated data streams.

According to another aspect, a data modulation apparatus including: a multiplexer, which multiplexes input data according to multiplexing information; a modulator, which inserts a synchronization codeword including the multiplexing information for a multiplexed data stream, and performs modulation and outputs each modulated stream; and a selector, which selects a respective modulated data stream having a DC component which is smallest from among the modulated streams.

According to another aspect, a data modulation apparatus is provided, which converts m-bit source data into an n-bit codeword ($n \geq m$) where a minimum constraint length is d and a maximum constraint length is k, the apparatus including: a pseudo scramble multiplexer, which multiplexes input data segmented by a predetermined length according to multiplexing information by discontinuously scrambling the segmented input data; a modulator, which inserts a synchronization codeword including the multiplexing information for a multiplexed data stream, and performs run length limited (RLL) modulation and outputs each modulated data stream; and a selector, which selects a respective modulated data stream having a DC component which is smallest from among the modulated streams.

BRIEF DESCRIPTION OF THE DRAWINGS

These and/or other aspects and advantages of the invention will become apparent and more readily appreciated from the following description of the preferred embodiments, taken in conjunction with the accompanying drawings of which:

FIGS. 2A-2C illustrate examples of synchronization codewords to be used in the present invention;

FIG. 3 is an example of the synchronization codeword made up of a synchronization body and a multiplexing identification (ID) of FIG. 2A;

DETAILED DESCRIPTION OF THE INVENTION

Figure 1:
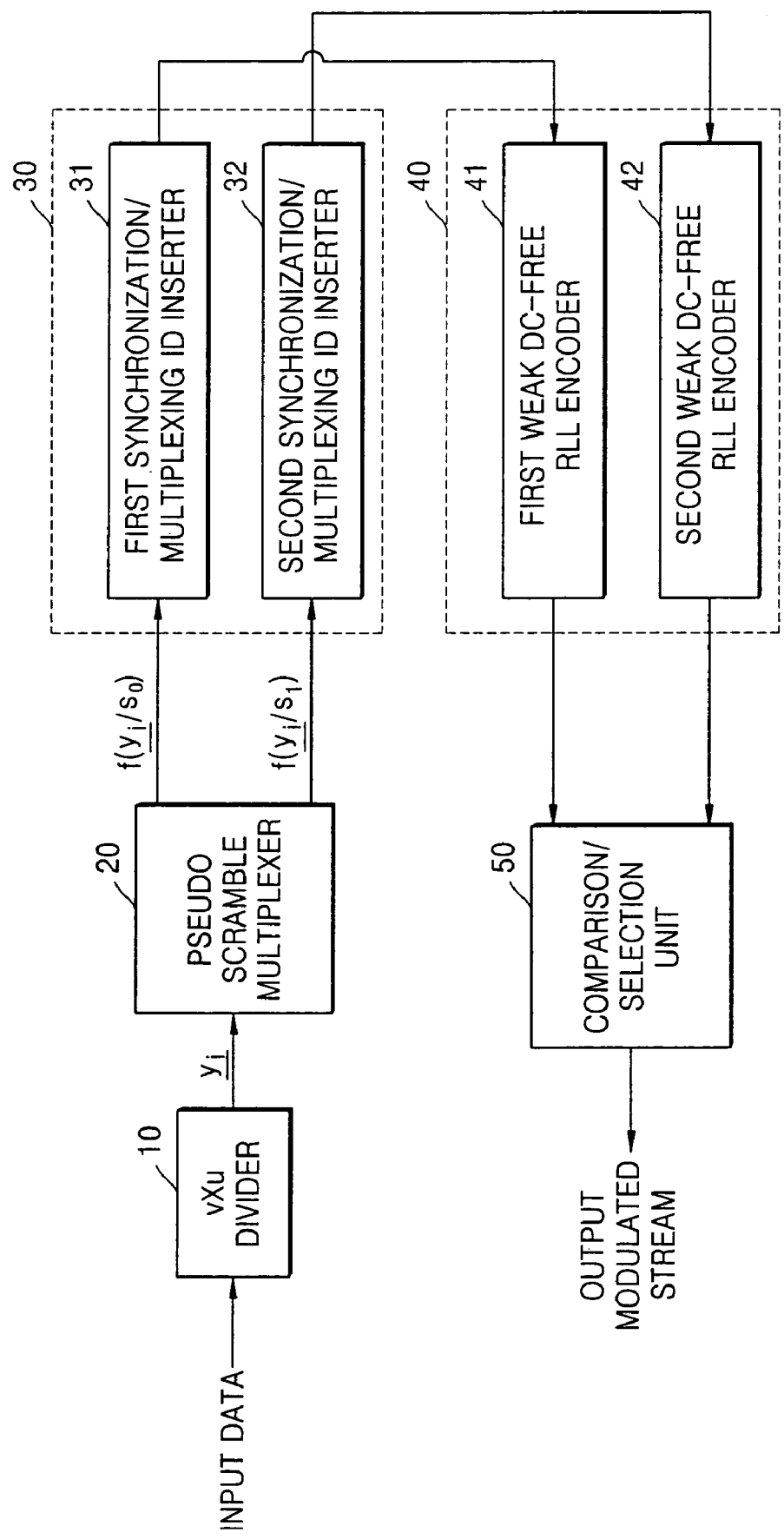
FIG. 1 is a block diagram of a data modulation apparatus according to an embodiment of the present invention.

Reference will now made in detail to the present preferred embodiments of the present invention, examples of which are illustrated in the accompanying drawings, wherein like reference numerals refer to the like elements throughout. The embodiment is described below in order to explain the present invention by referring to the figures.

FIG. 1 is a block diagram of a data modulation apparatus according to an embodiment of the present invention. The data modulation apparatus suppresses a DC component of a modulated codeword stream using a synchronization codeword.

With reference to FIG. 1, an input data row may be expressed by $x=(x_0, x_1, \ldots, x_{l-1})$ as in Equation 1, and the input data row is divided by vXu ($=k$) in a vXu divider 10 as in Equation 2, i.e., the input data row is divided by a v-data row, each piece of a data row having u bytes.

$$x=(x_0, x_1, \ldots, x_{k-1}, \ldots, x_{l-1})$$

$$B_x = \begin{Vmatrix} x_{0,0}, x_{0,1}, \cdots, x_{0,\mu-1} \\ x_{1,0}, x_{1,1}, \cdots, x_{1,\mu-1} \\ \cdots \\ x_{1,0}, x_{i,1}, \cdots, x_{i,j}, \cdots, x_{i,\mu-1} \\ \cdots \\ x_{y-1,0}, x_{y-1,1}, \cdots, x_{y-1,\mu-1} \end{Vmatrix} = \begin{Vmatrix} \underline{y_0} \\ \underline{y_1} \\ \cdots \\ \underline{y_i} \\ \cdots \\ \underline{y_{y-1}} \end{Vmatrix} K$$

where $x_{i,j}=x_{ixu+j}$.

After a pseudo scramble multiplexer 20 multiplexes each of the vXu data rows divided by the vXu divider 10 into 2 data rows by adding 1-bit multiplexing information to each of the divided vXu data rows, the pseudo scramble multiplexer 20 converts the two data rows into two pieces of pseudo random data according to the added 1-bit multiplexing information.

When a conversion into the pseudo random data is finished, two different multiplexed u-byte data are made from one u-byte data row $y_i$ as shown in Equations 3 and 4.

$$\underline{C_y}=(\underline{C_0}, \underline{C_1}, \ldots, \underline{C_i}, \ldots, \underline{C_{v-1}})$$

$$C_i = \begin{bmatrix} s_0, & y^0_{i,0}, & x_{i,1}, \ldots, & x_{i,q-1}, & y^0_{i,q}, & x_{i,q+1}, \ldots, & y^0_{i,p*q}, \ldots, & x_{i,u-1} \\ s_1, & y^1_{i,0}, & x_{i,1}, \ldots, & x_{i,q-1}, & y^1_{i,q}, & x_{i,q+1}, \ldots, & y^1_{i,p*q}, \ldots, & x_{i,u-1} \end{bmatrix}$$

$$= \begin{bmatrix} f(\underline{y_i}/s_0) \\ f(\underline{y_i}/s_1) \end{bmatrix}$$

Here, $u-1$ is a multiple of q, $p=0, 1, \ldots, r$, and $r=(u-1)/q$.

Function $f(\underline{y_i}/s_0)$ and function $f(\underline{y_i}/s_1)$ are two pieces of random data made from the input data row $\underline{y_i}$ using the 1-bit multiplexing information.

Each of first and second synchronization/multiplexing ID inserters 31 and 32 of a synchronization codeword inserter 30 inserts a synchronous codeword including a multiplexing ID converted from the multiplexing information in each of the two multiplexed pseudo random data rows, i.e., each of the two pseudo random data rows multiplexed by the multiplexing information. The multiplexing ID includes a parity control bit capable of suppressing a DC component included in the multiplexed codeword stream according to whether a parity of the multiplexed codeword stream is even or odd.

First and second weak DC-free RLL encoders 41 and 42 of an encoder 40 may include two channels according to the added multiplexing information, and may use a RLL modulation method. In particular, the first and second weak DC-free RLL encoders 41 and 42 may utilize a code of a weak DC-free RLL modulation method that does not have an additional DC suppression control code conversion table having an additional bit, so if there is no redundancy, DC suppression is possible but DC suppression performance decreases. The RLL modulation method converts m-bit source data into an n-bit codeword ($n \geq m$) where a minimum constraint length is d and a maximum constraint length is k.

That is, in a case where the encoder 40 performs weak-DC free RLL modulation without using the DC suppression control conversion table having an additional bit, the encoder 40 generates codewords suited to predetermined constraint length conditions, groups the codewords according to the predetermined constraint length conditions, and performs the RLL modulation using a main code conversion table including the codewords so that a code row of a source word has a DC control ability, and a DC suppression control subconversion table for codewords that satisfy the predetermined constraint length conditions and are not required in the main code conversion table. The synchronization codeword inserter 30 and the encoder 40 may be called a modulator.

A comparison/selection unit 50 compares RLL-modulated streams from the two channels and selects the modulated stream having a smaller DC component.

When m denotes a number of bits of data before modulation and n denotes a number of bits of a codeword after modulation, the data is multiplexed using a synchronization codeword such that the DC component included in a modulated codeword stream is more effectively suppressible without decreasing a code rate (i.e., a proportionality of m/n).

That is, the synchronization codeword comprises a synchronization body, which denotes a synchronous signal, and a multiplexing ID. The multiplexing ID is a parity control ID used to control a number of bits having a value of 1 in the synchronization codeword to be an even number or an odd number. For example, the synchronization codewords may be built as shown in FIGS. 2A-2C. In FIGS. 2A-2C, the synchronization body is a specific pattern belonging only to synchronous signals. For example, the specific pattern may be a pattern with a longest run length that is not included in other codewords. The multiplexing ID in the synchronization codeword makes a total number of bits having a value of 1 within a whole synchronization codeword an odd number or an even number. The multiplexing ID may be attached to or mixed in with the synchronization ID, which is used to classify another characteristic of the synchronization codeword.

A first type of synchronization codeword includes a synchronization body and a multiplexing ID controlling parity, as shown in FIG. 2A. A type of second synchronization codeword includes a synchronization body, a synchronization ID, and a multiplexing ID controlling the parity, as shown in FIG. 2B. A third type of synchronization codeword includes a synchronization body and a synchronization ID mixed in with a multiplexing ID controlling the parity, as shown in FIG. 2C.

FIG. 3 is an example of the first type of the synchronization codeword comprising the synchronization body and the multiplexing ID.

With reference to FIG. 3, in a modulation code where a minimum run length is 1 and a maximum run length is 7, the synchronization body classifies the synchronous signal using a run length of 8, which violates a k condition, and the multiplexing ID includes a parity control bit (displayed as x) to control the parity of the synchronization codeword. Regardless of the type of the synchronization codeword (three different types of synchronization codewords are shown in FIGS. 2A-2C), the parity control bit x operates according to a common principle to make a number of bits having a value of 1 in the synchronization codeword into an even number or an odd number.

When the multiplexing information multiplexing an input data row is 0, the synchronization ID and the multiplexing ID corresponding to the multiplexing information form the synchronization codeword having an even parity. Conversely, when the multiplexing information multiplexing the input data row is 1, the synchronization ID and multiplexing ID corresponding to the multiplexing information form the synchronization codeword having an odd parity.

Figure 4:
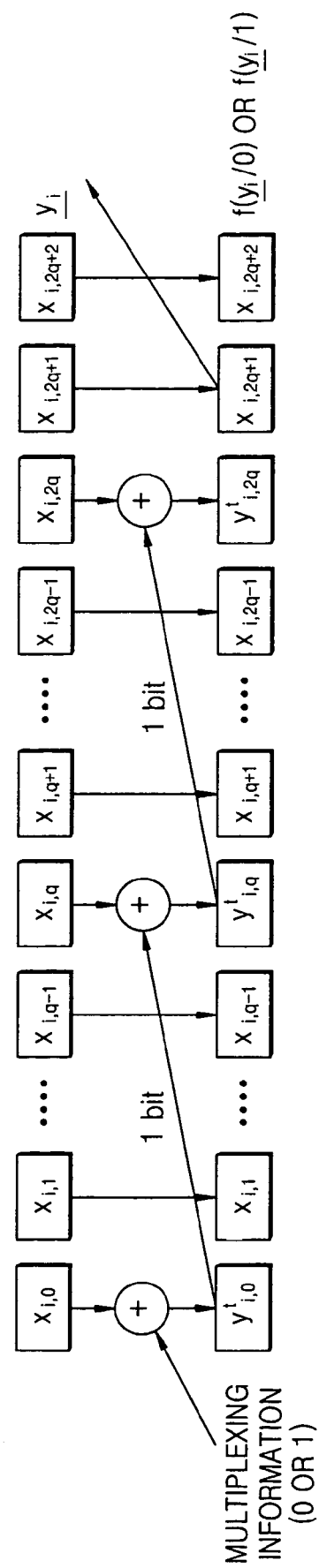
FIG. 4 shows how a pseudo scramble multiplexer of the data modulation apparatus of FIG. 1 which generates an input data stream multiplexed in one of two different operations corresponding to input multiplexing information of 0 or 1.

FIG. 4 shows how a pseudo scramble multiplexer 20 of FIG. 1 generates an input data stream multiplexed in one of two different ways corresponding to the input multiplexing information being 0 or 1.

A pseudo scramble multiplexing method refers to a method of discontinuously scrambling the input data and, otherwise, does not refer to a multiplexing method of continuously scrambling input data. In the multiplexing method of continuously scrambling the input data, an error occurring at a certain position propagates to subsequent data. However, if data is scrambled in a discontinuous manner within a limit of not affecting a DC component of a code row, a probability of such error propagation is reducible.

In FIG. 4, $\underline{y}_i$, an input data row having a length of u bytes comprising predetermined bits of data $x_{i,0}|x_{i,u-1}$, is converted into pseudo random data $f(\underline{y}_i/0)$ or $f(\underline{y}_i/1)$ through 1-bit multiplexing information (0 or 1) and exclusive OR (EXOR) operations by EXOR gates disposed every qth term corresponding to a scramble period which is not continuously disposed.

By performing an EXOR operation on an initial unit of data to be modulated $x_{i,0}$ (called a code modulation unit) and 1-bit initial data (multiplexing information), converted data $y^t_{i,0}$, which corresponds to the initial code modulation unit and does not include the initial data, is generated. Code modulation units $x_{i,1}$ through $x_{i,q-1}$, are output without any EXOR operation, and then the EXOR operation is again performed on the converted data $y^t_{i,0}$ of the initial code modulation unit and a qth code modulation unit $x_{i,q}$ to produce the next converted data $y^t_{i,q}$ in a common manner as that of $y^t_{i,0}$. In this manner, the EXOR operations are repeated every qth unit up to a final code modulation unit of the input data row $\underline{y}_i$.

Figure 5:
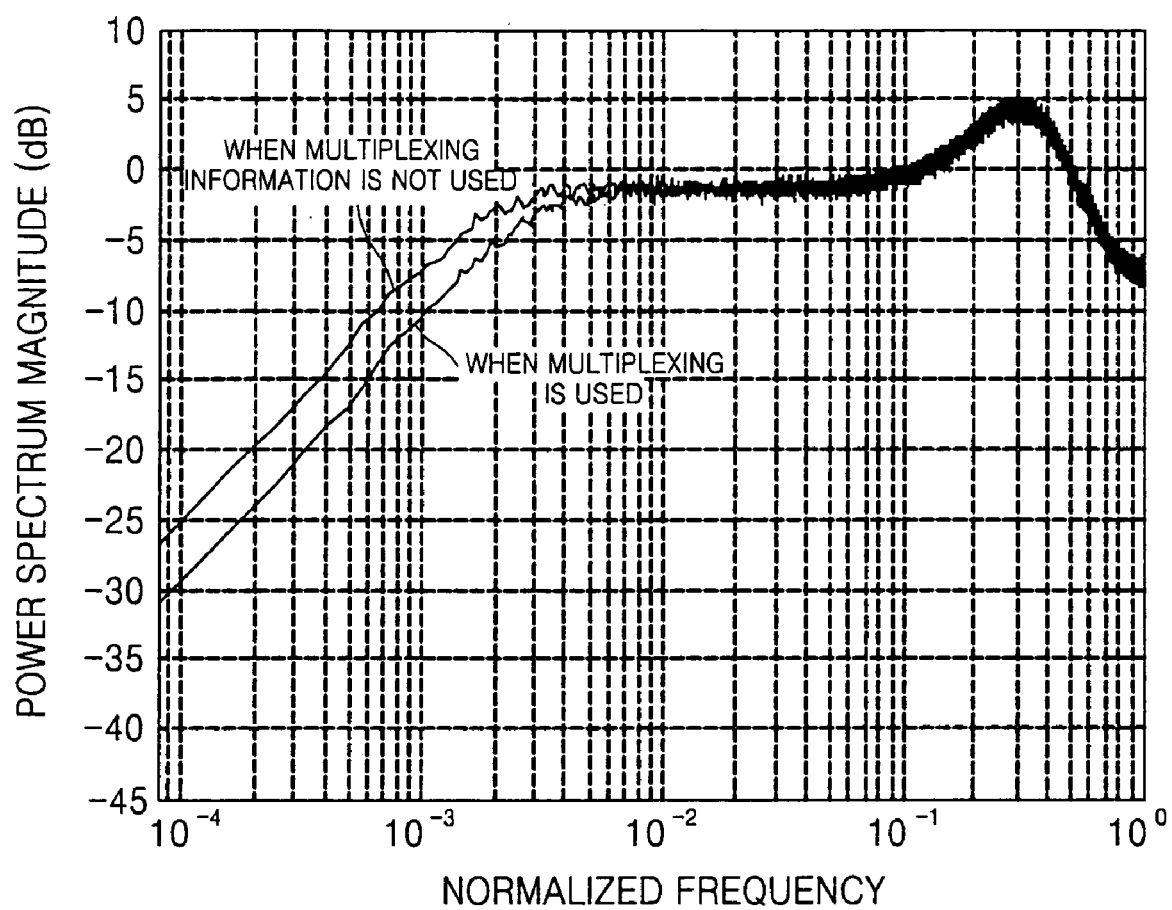
FIG. 5 is a graph illustrating a power spectrum density curve showing a DC suppression performance improvement when data is multiplexed by a synchronization codeword according to the present invention.

FIG. 5 is a graph illustrating a power spectrum density (PSD) curve showing a DC suppression ability when a synchronization codeword is used as the multiplexing information. FIG. 5 shows that DC suppression is improved when the input data is multiplexed according to the parity (i.e., even or odd parity) of the synchronization codeword having a parity bit controlling the parity within the synchronization codeword. When data is multiplexed according to the parity bit of the synchronization codeword with a scramble spacing index q=5, the DC suppression ability (i.e., effect) is 4 dB greater than when the data is not multiplexed.

As described above, a DC component included in a modulated codeword stream is more effectively suppressible without a decrease in a code rate by multiplexing input data according to a parity (i.e., even or odd parity) of a synchronization codeword having a parity bit controlling the parity within the synchronization codeword.

Although a few preferred embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A data modulation method comprising:
    multiplexing input data according to multiplexing information;
    inserting a synchronization codeword including the multiplexing information for a multiplexed data stream, and performing data modulation and outputting plural modulated data streams; and
    selecting a respective one of the modulated data streams having a DC component which is smallest from among the plural modulated data streams.

2. The method of claim 1, further comprising:
    determining the multiplexing information to multiplex the input data according to whether a parity of the synchronization codeword, which is a number of bits having a value of 1, is even or is odd.

3. The method of claim 2, further comprising: changing a parity control bit to 0 or 1 to control of the parity of the synchronization codeword.

4. The method of claim 2, wherein the synchronization codeword comprises a synchronization body and a multiplexing ID to control the parity.

5. The method of claim 2, wherein the synchronization codeword comprises a synchronization body, a synchronization ID, and a multiplexing ID to control the parity.

6. The method of claim 2, wherein the synchronization codeword comprises a synchronization body and a synchronization ID mixed in with a multiplexing ID to control the parity.

7. A data modulation method, according to which m-bit source data is converted into an n-bit codeword where n≧m and a minimum constraint length is d and a maximum constraint length is k, the method comprising:
    multiplexing input data segmented by a predetermined length according to multiplexing information by discontinuously scrambling the segmented input data;
    inserting a synchronization codeword including the multiplexing information for a multiplexed data stream, and performing run length limited modulation and outputting plural modulated data streams; and
    selecting a respective one of the modulated data streams having a DC component which is smallest from among the modulated data streams.

8. The method of claim 7, further comprising:
    determining the multiplexing information to multiplex the input data according to whether a parity of the synchronization codeword, which is a number of bits having a value of 1, is even or is odd.

9. The method of claim 8, further comprising:
    changing a parity control bit to 0 or 1 to control of the parity of the synchronization codeword.

10. The method of claim 8, wherein the synchronization codeword comprises a synchronization body, which has a predetermined pattern having a maximum run length violating a maximum constraint length k condition, and a multiplexing ID to control the parity.

11. The method of claim 8, wherein the synchronization codeword comprises a synchronization body, which has a predetermined pattern having a maximum run length violating a maximum constraint length k condition, a synchronization ID, and a multiplexing ID to control the parity.

12. The method of claim 8, wherein the synchronization codeword comprises a synchronization body, which has a predetermined pattern having a maximum run length violating a maximum constraint length k condition, and a synchronization ID mixed in with a multiplexing ID to control the parity.

13. The method of claim 8, wherein the multiplexing of the input data comprises:
generating first converted data from the input data by performing an exclusive OR operation on initial 1-bit multiplexing information and immediately subsequent m-bit data as a first code modulation unit for two types of multiplexed data rows;
outputting $2^{nd}$ through $(q-1)^{th}$ code modulation units without performing any exclusive OR operation, where q is a scramble spacing index;
generating next converted data from the input data by performing another exclusive OR operation on the first converted data of the first code modulation unit and data of a qth code modulation unit; and
repeatedly performing further exclusive OR operations every qth code modulation unit up to a final code modulation unit of the input data row.

14. The method of claim 8, wherein in the performing of the run length limited modulation, a weak DC-free run length limited modulation, which is DC free but has insufficient DC suppression performance, is performed.

15. A data modulation apparatus comprising:
a multiplexer which multiplexes input data according to multiplexing information;
a modulator which inserts a synchronization codeword including the multiplexing information into the multiplexed input data for a multiplexed data stream, and performs modulation and outputs plural modulated data streams; and
a selector which selects a respective one of the modulated data streams having a DC component which is smallest from among the plural modulated data streams.

16. The apparatus of claim 15, further comprising:
determining the multiplexing information to multiplex the input data according to whether a parity of the synchronization codeword, which is a number of bits having a value of 1, is even or is odd.

17. The apparatus of claim 15, further comprising:
changing a parity control bit to 0 or 1 to control of the parity of the synchronization codeword.

18. The apparatus of claim 15, wherein the synchronization codeword comprises a synchronization body and a multiplexing ID to control the parity.

19. The apparatus of claim 15, wherein the synchronization codeword comprises a synchronization body, a synchronization ID, and a multiplexing ID to control the parity.

20. The apparatus of claim 15, wherein the synchronization codeword comprises a synchronization body and a synchronization ID mixed in with a multiplexing ID to control the parity.

21. A data modulation apparatus, which converts m-bit source data into an n-bit codeword where n≧m and a minimum constraint length is d and a maximum constraint length is k, the apparatus comprising:
a pseudo scramble multiplexer which multiplexes input data segmented by a predetermined length according to multiplexing information by discontinuously scrambling the segmented input data;
a modulator which inserts a synchronization codeword including the multiplexing information into the multiplexed input data for a multiplexed data stream, and performs run length limited modulation and outputs plural modulated data streams; and
a selector which selects a respective one of the modulated data streams having a DC component which is smallest from among the modulated streams.

22. The apparatus of claim 21, further comprising: determining the multiplexing information to multiplex the input data according to whether a parity of the synchronization codeword, which is a number of bits having a value of 1, is even or is odd.

23. The apparatus of claim 22, further comprising: changing a parity control bit to 0 or 1 to control of the parity of the synchronization codeword.

24. The apparatus of claim 22, wherein the synchronization codeword comprises a synchronization body, which has a predetermined pattern having a maximum run length violating a maximum constraint length k condition, and a multiplexing ID to control the parity.

25. The apparatus of claim 22, wherein the synchronization codeword comprises a synchronization body, which has a predetermined pattern having a maximum run length violating a maximum constraint length k condition, a synchronization ID, and a multiplexing ID to control the parity.

26. The apparatus of claim 22, wherein the synchronization codeword comprises a synchronization body, which has a predetermined pattern having a maximum run length violating a maximum constraint length k condition, and a synchronization ID mixed in with a multiplexing ID to control the parity.

27. The apparatus of claim 22, wherein the pseudo scramble multiplexer comprises an exclusive OR gate disposed every qth, where q is scramble spacing index, and generates first converted data from the input data by performing an exclusive OR operation on initial 1-bit multiplexing information and immediately subsequent m-bit data as a first code modulation unit for two types of multiplexed data rows, outputs $2^{nd}$ through $(q-1)^{th}$ code modulation units without performing any exclusive OR operation, generates next converted data from the input data by performing another exclusive OR operation on the first converted data of the first code modulation unit and data of a qth code modulation unit, and repeatedly performs further exclusive OR operations every qth code modulation unit up to a final code modulation unit of the input data row.

28. The apparatus of claim 22, wherein the modulator comprises:
first and second synchronization codeword inserters, which insert the synchronization codeword including the multiplexing information, for two types of multiplexed data streams; and
first and second DC-free run length limited encoders, which perform a weak DC-free run length limited modulation that is DC free but has insufficient DC suppression performance on the two types of multiplexed data streams.

29. The apparatus of claim 28, wherein the first and second DC free run length limited encoders, which do not use a DC suppression control conversion table having an additional bit, generate codewords suited to predetermined constraint length conditions, group the codewords according to the predetermined constraint length conditions, and perform the run length limited modulation using a main code conversion table containing the codewords so that a code row of a source word has a DC control operation, and a DC suppression control sub-conversion table for codewords which satisfy the predetermined constraint length conditions and are not required in the main code conversion table.

30. A data modulation method comprising:
  multiplexing input data according to parity data of a synchronization codeword;
  inserting the synchronization codeword including the parity data for the multiplexed input data to produce a multiplexed data stream;
  performing data modulation on the multiplexed data stream having the synchronization codeword inserted to output plural modulated data streams; and
  selecting and outputting a respective one of the modulated data streams having a DC component which is smallest from among the plural modulated data streams.

31. A data modulation method, according to which m-bit source data is converted into an n-bit codeword where n≧m and a minimum constraint length is d and a maximum constraint length is k, the method comprising:
  multiplexing input data segmented by a specified length according to parity data of a synchronization codeword by intermittently rearranging the segmented input data to produce a multiplexed data stream;
  inserting the synchronization codeword including the parity data for the multiplexed data stream;
  performing run length limited modulation on the multiplexed data stream having the synchronization codeword inserted to output plural modulated data streams; and
  selecting and outputting a respective one of the modulated data streams having a DC component which is smallest from among the modulated data streams.

32. A data modulation apparatus comprising:
  a multiplexer to multiplex input data according to parity data of a synchronization codeword to produce a multiplexed data stream;
  a modulator to insert the synchronization codeword including the parity data for the multiplexed data stream, to perform modulation on the multiplexed input data stream having the synchronization codeword inserted, and to output plural modulated data streams; and
  a selector to select and to output a respective one of the modulated data streams having a DC component which is smallest from among the plural modulated data streams.

33. A data modulation apparatus to convert m-bit source data into an n-bit codeword where n≧m and a minimum constraint length is d and a maximum constraint length is k, the apparatus comprising:
  a pseudo scramble multiplexer to multiplex input data segmented by a specified length according to parity data of a synchronization codeword by intermittently rearranging the segmented input data to produce a multiplexed data stream;
  a modulator to insert the synchronization codeword including the parity data for the multiplexed data stream, to perform run length limited modulation on the multiplexed data stream having the synchronization codeword inserted, and to output plural modulated data streams; and
  a selector to select and to output a respective one of the modulated data streams having a DC component which is smallest from among the modulated streams.

* * * * *